US012264946B2

(12) United States Patent
Qama et al.

(10) Patent No.: US 12,264,946 B2
(45) Date of Patent: Apr. 1, 2025

(54) METHOD FOR ERROR DETECTION OF A POSITION SENSOR AND POSITION SENSOR

(71) Applicant: Renesas Electronics America Inc., Milpitas, CA (US)

(72) Inventors: Gentjan Qama, Munich (DE); Jürgen Peter Kernhof, Dresden (DE); Angel Karachomakov, Varna (BG); Andreas Leo Buchinger, Dresden (DE); Thomas Oswald, Dresden (DE)

(73) Assignee: Renesas Electronics America Inc., Milpitas, CA (US)

( * ) Notice: Subject to any disclaimer, the term of this patent is extended or adjusted under 35 U.S.C. 154(b) by 130 days.

(21) Appl. No.: 17/958,707

(22) Filed: Oct. 3, 2022

(65) Prior Publication Data

US 2023/0116552 A1    Apr. 13, 2023

(51) Int. Cl.
| G01D 5/20 | (2006.01) |
| G01D 3/08 | (2006.01) |
| G01D 5/22 | (2006.01) |
| G01D 5/244 | (2006.01) |
| G01D 18/00 | (2006.01) |

(52) U.S. Cl.
CPC ............. *G01D 5/2053* (2013.01); *G01D 3/08* (2013.01); *G01D 5/2046* (2013.01); *G01D 5/2225* (2013.01); *G01D 5/2275* (2013.01); *G01D 5/2448* (2013.01); *G01D 18/00* (2013.01); *G01D 18/001* (2021.05); *G01D 2205/22* (2021.05)

(58) Field of Classification Search
CPC .. G01D 5/2046; G01D 5/2053; G01D 5/2225; G01D 5/2275; G01D 5/2448; G01D 18/00; G01D 18/001
See application file for complete search history.

(56) References Cited

U.S. PATENT DOCUMENTS

| 6,029,363 | A | * | 2/2000 | Masreliez | G01D 5/2449 33/708 |
| 6,265,867 | B1 | * | 7/2001 | Fowler | G01D 5/2216 324/207.16 |
| 2014/0316733 | A1 | * | 10/2014 | Mori | G01D 5/00 702/94 |
| 2018/0115261 | A1 | * | 4/2018 | Staebler | G01D 18/002 |
| 2020/0116532 | A1 | * | 4/2020 | Janisch | G01D 3/036 |
| 2020/0264016 | A1 | * | 8/2020 | Janisch | G01D 5/24476 |

* cited by examiner

*Primary Examiner* — Steven L Yeninas
(74) *Attorney, Agent, or Firm* — SCULLY, SCOTT, MURPHY & PRESSER, P.C.

(57) ABSTRACT

A position sensor, wherein the position sensor detects the movement of a target relative to a sine receiver coil and a cosine receiver coil and generates a corresponding sine signal and a corresponding cosine signal, and a method for error detection of a position sensor.

15 Claims, 3 Drawing Sheets

METHOD FOR ERROR DETECTION OF A POSITION SENSOR AND POSITION SENSOR

CROSS-REFERENCE TO RELATED APPLICATION

The present application claims priority to European Patent Application No. 21201500.2, filed on Oct. 7, 2021. The entire disclosure of European Patent Application No. 21201500.2 is incorporated herein by this reference.

BACKGROUND

The present disclosure relates to a method for error detection of a position sensor. The present disclosure further relates to a position sensor implementing the method for error detection. Particularly, the present disclosure relates to rotary inductive position sensors, comprising a transmitter coil and at least two receiver coils, particularly a sine receiver coil and a cosine receiver coil, a moving target and an electronic control circuit.

Inductive position sensors implement a magnet-free technology, utilizing the physical principles of eddy currents or inductive coupling to detect the position of a target that is moving above a set of coils, consisting for example of one transmitter coil and two receiver coils, particularly a sine receiver coil and a cosine receiver coil.

In a practical implementation the three coils, one transmitter coil and two receiver coils, are typically provided as copper traces on a printed circuit board (PCB). They are arranged such that the transmitter coil induces a secondary voltage in the two receiver coils, which depends on the position of the conductive, e.g., metallic, target above the receiver coils. Therefore, the inductive sensor comprises an oscillator that generates a radio-frequency signal, which is applied to the transmitter coil to create a high frequency magnetic field. This high frequency magnetic field is picked up by the receiver coils, particularly the sine receiver coil and the cosine receiver coil. Depending on the position of the conductive target above the coils, the secondary voltage picked up by the receiver coils is changing in amplitude, allowing the determination of the target's position by analysing this effect. For example, the target position is calculated by the arctangent of the sine signal divided by the cosine signal.

The conductive target can be any kind of metal, such as aluminium, steel or a printed circuit board with a printed copper layer. Usually, an inductive position sensor comprises a metallic target. However, the inductive position sensor may use different types of targets, such as wire loops or passive resonant circuits comprised of inductances and capacitors.

To meet the automotive safety integrity level (ASIL) requirement for an electronic component, some coverage of error detection is typically required.

It is therefore an object to provide an external mechanism for detecting an error in the position sensor by continuously checking the sine and cosine signals during normal operation of the position sensor.

SUMMARY

In an embodiment, a method for error detection of a position sensor is disclosed. The position sensor detects the movement of a target relative to a sine receiver coil and a cosine receiver coil and generates a corresponding sine signal and a corresponding cosine signal. The method comprises the steps of:

monitoring the sine signal and cosine signal of the position sensor over at least one full period;

determining a sine offset calculating an average of the monitored sine signal;

determining a cosine offset by calculating an average of the monitored cosine signal;

determining an amplitude of the sine signal by subtracting the minimum value of the monitored sine signal from the maximum value of the monitored sine signal;

determining an amplitude of the cosine signal by subtracting the minimum value of the monitored cosine signal from the maximum value of the monitored cosine signal;

determining an amplitude mismatch by subtracting the amplitude of the sine signal from the amplitude of the cosine signal and dividing the result by two or by subtracting the amplitude of the cosine signal from the amplitude of the sine signal and dividing the result by two;

determining an offset error factor by dividing a first coefficient by the determined amplitude of the sine signal or the determined amplitude of the cosine signal or an average of the determined amplitude of sine signal and the cosine signal;

determining an amplitude error factor by dividing a second coefficient by the determined amplitude of the sine signal or the determined amplitude of the cosine signal or an average of the determined amplitude of sine signal and the cosine signal;

determining an offset error of the position sensor by adding the absolute value of the determined sine offset and the absolute value of the determined cosine offset and multiplying the sum with the determined offset error and dividing the result by a third coefficient;

determining an amplitude error of the position sensor by multiplying the absolute value of the determined amplitude mismatch by the determined amplitude error; and determining the overall error of the position sensor by adding the determined offset error and the determined amplitude error.

The amplitude mismatch can be alternatively determined by subtracting the amplitude of the cosine signal from the amplitude of the sine signal and dividing the result by 2, as later on the method according to the embodiment only uses the absolute value of the determined amplitude mismatch.

The above method can be represented by the following calculations respectively formulas:

$$\text{offset}_{sine} = \frac{(\max(sine) + \min(sine))}{2}$$

$$\text{offset}_{cosine} = \frac{(\max(cosine) + \min(cosine))}{2}$$

$$amp_{sine} = \max(sine) - \min(sine)$$

$$amp_{cosine} = \max(cosine) - \min(cosine)$$

$$\text{mismatch}_{amp} = \frac{amp_{cosine} - amp_{sine}}{2}$$

$$\text{offseterror}_{factor} = \frac{\text{first coefficient}}{amp_{sine} \text{ OR } amp_{cosine} \text{ OR } avg(amp_{sine}:amp_{cosine})}$$

$$\text{amperror}_{factor} = \frac{\text{second coefficient}}{amp_{sine} \text{ OR } amp_{cosine} \text{ OR } avg(amp_{sine}:amp_{cosine})}$$

-continued $$\text{error}_{amp} = \left((\text{abs}(\text{mismatch}_{amp}) * \text{amperror}_{factor})\right)$$

$$\text{error}_{offset} = \frac{\text{offseterror}_{factor} * (\text{abs}(\text{offset}_{sine}) + \text{abs}(\text{offset}_{cosine}))}{\text{third coefficient}}$$

$$\text{error}_{overall} = \text{error}_{amp} + \text{error}_{offset}$$

The overall error is calculated as the difference between the mechanical position of the target and the measured position. The overall error is expressed in electrical degrees.

The embodiment is based on the findings that the overall position error has linear correlation with the offset and amplitude mismatch between the sine signal and cosine signal of the position sensor. Particularly, it has been discovered that the offset and amplitude mismatch between the sine signal and cosine signal of the position sensor are independent of each other, so that the superposition principle can be used. Thus, every single effect, offset or amplitude mismatch in one of the channels, sine and cosine, generates a certain error. Knowing the error generated from each single effect, the overall error can be estimated by adding these errors of the single effects.

The method according to the embodiment monitors the sine signal and cosine signal of the position sensor over at least one full period. It is possible to monitor more than periods, but one full period is the minimum requirement of the inventive method. The sine signal and the cosine signal are analog signals.

By continuously monitoring the sine signal and cosine signal of the position sensor during normal operation the method according to the embodiment can determine the overall error of the position sensor and provide an indication whether certain error requirements like automotive safety integrity levels are fulfilled or not.

The error caused by offset or amplitude mismatch is linear. According to a variant of the embodiment, the first coefficient for determining the offset error factor is decided based on a slope of an error electrical degree versus the offset. Using simulation and measurement data the first coefficient has been determined to be 57,416 divided by the amplitude of either the sine signal or cosine signal or the average of both signals for the offset error.

In a variant of the embodiment, the second coefficient for determining the amplitude error is decided based on a slope of an error electrical degree versus the amplitude mismatch. Using simulation and measurement data the second coefficient has been determined to be 28,605 divided by the amplitude of either the sine signal or cosine signal or the average of both signals for the amplitude mismatch error have been discovered.

Pursuant to a variant of the embodiment, the method comprises the further step of checking if the determined overall error of the position sensor is below a predefined threshold. The predefined threshold is for example an automotive safety integrity level.

In a variant of the embodiment, the method comprises the step of issuing an alarm or indication if the determined overall error exceeds the predefined threshold. Thus, the system using the value of the position sensor is informed in case the threshold, e.g., automotive safety integrity level, is not fulfilled. According to a variant of the embodiment, the predefined threshold is three electrical degree, six electrical degree or nine electrical degree.

If the absolute value of the determined sine offset and the absolute value of the determined cosine offset are in the same range, i.e., comparable to each other, the third coefficient is 1.4, more precisely $\sqrt{2}$.

Pursuant to a variant of the embodiment, the accuracy of the error determination can be further increased in cases where the absolute value of the determined sine offset and the absolute value of the determined cosine offset differ from each other. Generally, if the absolute value of the determined sine offset and the absolute value of the determined cosine offset differ are comparable, the third coefficient is 1.4 (exactly $\sqrt{2}$) and as the difference increases the third coefficient goes to 1.0. If the absolute value of the determined sine offset and the absolute value of the determined cosine offset differ by a factor of 3, the third coefficient for determining the offset error is 1,265 instead of 1.4. If the absolute value of the determined sine offset and the absolute value of the determined cosine offset differ by a factor of 5, the third coefficient for determining the offset error is 1.18 instead of 1.4 and if the absolute value of the determined sine offset and the absolute value of the determined cosine offset differ by a factor of 11, the third coefficient for determining the offset error is 1.09 instead of 1.4. Generally, as the difference between the absolute value of the determined sine offset and the absolute value of the determined cosine offset increases, the third coefficient goes from $\sqrt{2}$ to 1.

According to a variant of the embodiment, the position sensor is a rotational position sensor.

The object is further solved by a position sensor comprising a sine receiver coil and a cosine receiver coil, generating a corresponding sine signal and a corresponding cosine signal depending on the movement of a target relative to the sine receiver coil and the cosine receiver coil, wherein the position sensor implements the method according to the above-described embodiment.

DETAILED DESCRIPTION

Figure 1:
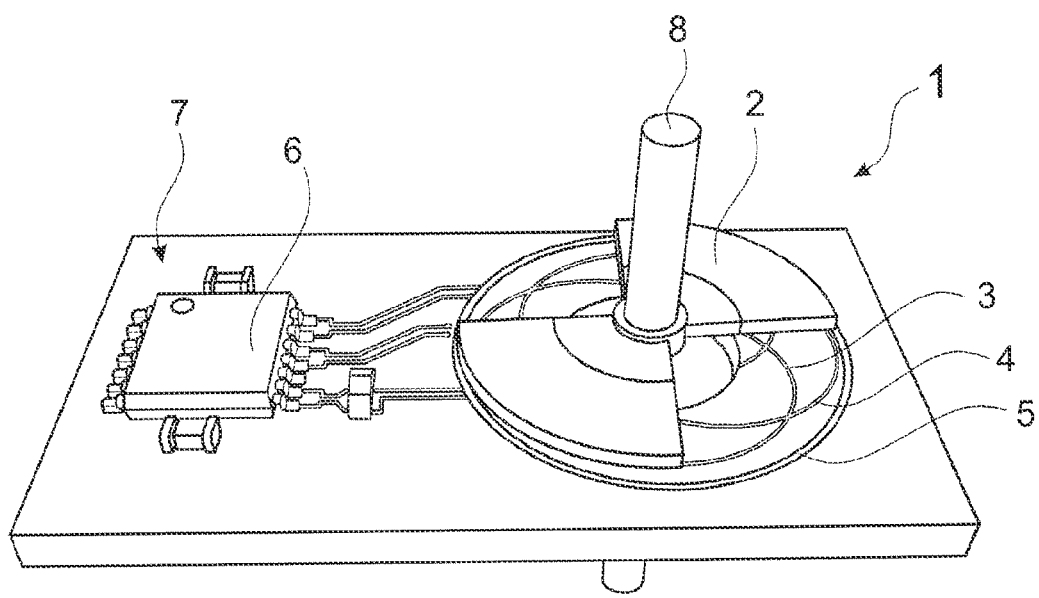
FIG. 1 a schematic view of an embodiment of a rotational position sensor implementing the method according to an embodiment.

FIG. 1 shows a schematic view of a rotational position sensor 1 implementing a method according to an embodiment. The position sensor 1 detects the movement of a target 2 relative to a sine receiver coil 3 and a cosine receiver coil 4 and generates a corresponding sine signal and a corresponding cosine signal. The sine signal and the cosine signal are analog signals.

The position sensor 1 of FIG. 1 is an inductive position sensor implementing a magnet-free technology, utilizing the physical principles of eddy currents or inductive coupling to detect the position of the target 2 that is moving above a set of coils 3, 4, 5, consisting for example of one transmitter coil 5 and two receiver coils 3, 4, particularly a sine receiver coil 3 and a cosine receiver coil 4.

In a practical implementation the three coils 3, 4, 5, one transmitter coil 5 and two receiver coils 4, 5, are typically provided as copper traces on a printed circuit board (PCB) 7. They are arranged such that the transmitter coil 5 induces a secondary voltage in the two receiver coils 3, 4, which depends on the position of the conductive, e.g., metallic, target 2 above the receiver coils 3, 4. Therefore, the position sensor 1 comprises an oscillator that generates a radio-frequency signal, which is applied to the transmitter coil 5 to create a high frequency magnetic field. This high frequency magnetic field is picked up by the receiver coils 3, 4, particularly the sine receiver coil 3 and the cosine receiver coil 4. Depending on the position of the conductive target 2 above the coils 3, 4, 5, the secondary voltage picked up by the receiver coils 3, 4 is changing in amplitude, allowing the determination of the target's position by analysing this effect. For example, the target position is calculated by the arctangent of the sine signal divided by the cosine signal. The calculation is performed by a processing unit 6, which is preferably also arranged on the printed circuit board 7.

The moving target 2 is for example mounted on a rotating shaft 8.

A signal representation of the target's position over the coils 3, 4, 5 is obtained by demodulating and processing the secondary voltages from the receiver coils 3, 4 in the processing unit 6. Usually, after filtering the receiver signals are demodulated and amplified, then converted to a digital signal by an analog-to-digital converter and further processed in a digital signal processor, like being converted from sine and cosine signals into an angle representation by means of a CORDIC algorithm, transforming rectangular coordinates to polar coordinates. Following this digital signal processing, a signal representative of the target's position over the coils 3, 4, 5 is available in digital format and fed to an output interface of the position sensor 1.

According to the present embodiment, the position sensor 1 monitors the sine signal and cosine signal of the position sensor 1 over at least one full period, preferably continuously during the whole operation of the position sensor 1.

Figure 2:
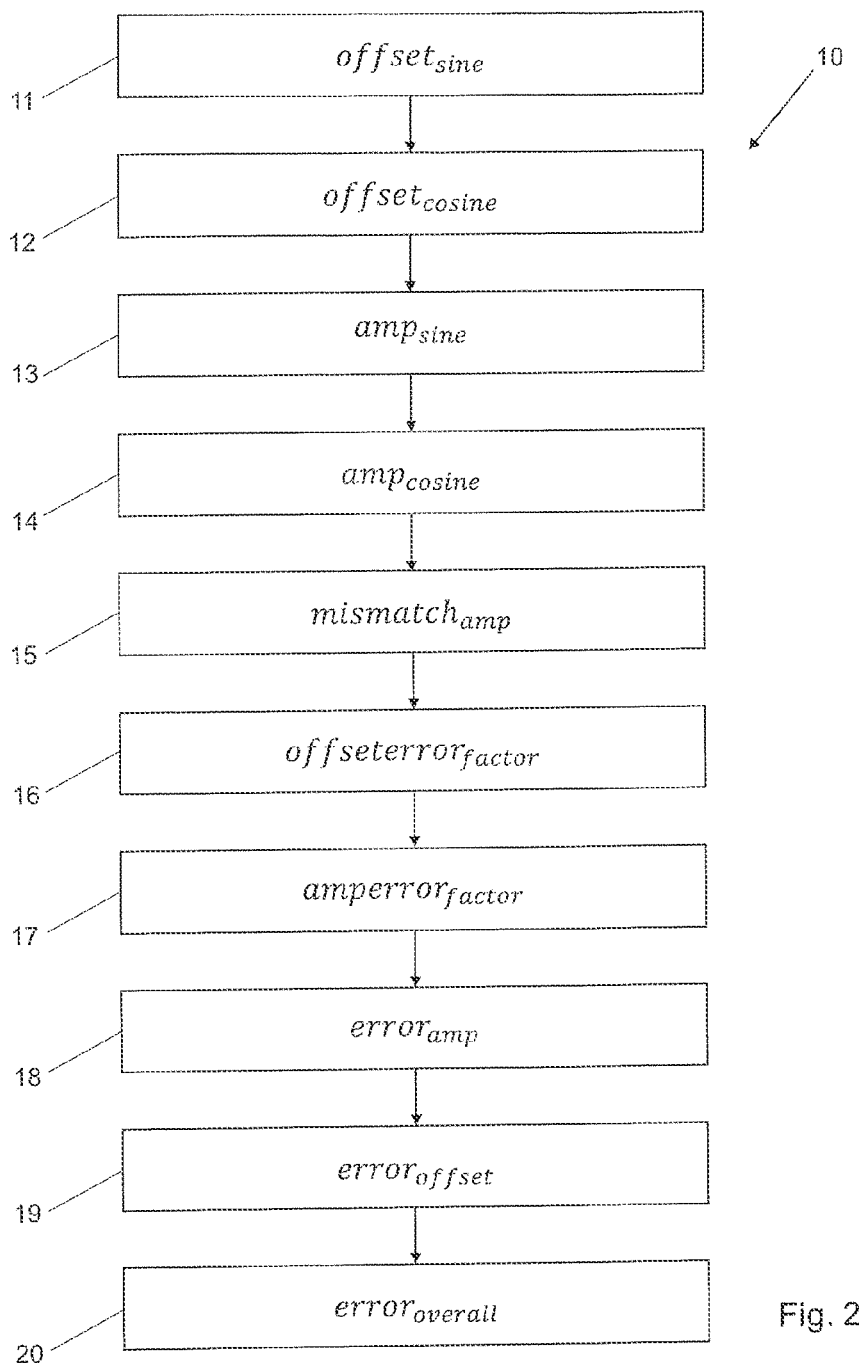
FIG. 2 a schematic flow diagram showing the calculations of an embodiment of the method for error detection of a position sensor according to an embodiment.

FIG. 2 shows a schematic flow diagram of an embodiment of the method 10 for error detection of a position sensor 1 according to the embodiment. This method is for example implemented in the processing unit 6. The method comprises the following steps:

Determining 11 a sine offset by calculating an average of the monitored sine signal, e.g., by adding the maximum value of the monitored sine signal and the minimum value of the monitored sine signal and dividing the sum by two;
  determining 12 a cosine offset by calculating an average of the monitored cosine signal, e.g., by adding the maximum value of the monitored cosine signal and the minimum value of the monitored cosine signal and dividing the result by two;
  determining 13 an amplitude of the sine signal by subtracting the minimum value of the monitored sine signal from the maximum value of the monitored sine signal;
  determining 14 an amplitude of the cosine signal by subtracting the minimum value of the monitored cosine signal from the maximum value of the monitored cosine signal;
  determining 15 an amplitude mismatch by subtracting the amplitude of the sine signal from the amplitude of the cosine signal and dividing the result by two or by subtracting the amplitude of the cosine signal from the amplitude of the sine signal and dividing the result by two;
  determining 16 an offset error factor by dividing a first coefficient by the determined amplitude of the sine signal or the determined amplitude of the cosine signal or an average of the determined amplitude of sine signal and the cosine signal;
  determining 17 an amplitude error factor by dividing a second coefficient by the determined amplitude of the sine signal or the determined amplitude of the cosine signal or an average of the determined amplitude of sine signal and the cosine signal;
  determining 18 an offset error of the position sensor 1 by adding the absolute value of the determined sine offset and the absolute value of the determined cosine offset and multiplying the sum with the determined offset error and dividing the result by a third coefficient;
  determining 19 an amplitude error of the position sensor 1 by multiplying the absolute value of the determined amplitude mismatch by the determined amplitude error; and
  determining 20 the overall error of the position sensor 1 by adding the determined offset error and the determined amplitude error.

The steps are not necessarily performed in a certain order, as long the steps do not depend on results of previous steps.

The error caused by offset or amplitude mismatch is linear.

According to a variant of the embodiment, the first coefficient for determining the offset error factor is decided based on a slope of an error electrical degree versus the offset. Using simulation and measurement data the first coefficient has been determined to be 57,416 divided by the amplitude of either the sine signal or cosine signal or the average of both signals for the offset error.

In a variant of the embodiment, the second coefficient for determining the amplitude error is decided based on a slope of an error electrical degree versus the amplitude mismatch. Using simulation and measurement data the second coefficient has been determined to be 28,605 divided by the amplitude of either the sine signal or cosine signal or the average of both signals for the amplitude mismatch error have been discovered.

Preferably, the method 10 comprises the further step of checking if the determined overall error of the position sensor 1 is below a predefined threshold. If the determined overall error exceeds the predefined threshold an alarm or indication can be issued and e.g., forwarded to a system receiving the data from the position sensor 1. The predefined threshold is for example three electrical degree, six electrical degree or nine electrical degree.

If the absolute value of the determined sine offset and the absolute value of the determined cosine offset are in the same range, i.e., comparable to each other, the third coefficient is 1,4, more precisely $\sqrt{2}$.

Pursuant to a variant of the embodiment, the accuracy of the error determination can be further increased in cases where the absolute value of the determined sine offset and the absolute value of the determined cosine offset differ strongly from each other. If the absolute value of the determined sine offset and the absolute value of the determined cosine offset differ by a factor of 3, the third coefficient for determining the offset error is 1,265 instead of 1.4. If the absolute value of the determined sine offset and the absolute value of the determined cosine offset differ by a factor of 5, the third coefficient for determining the offset error is 1.18 instead of 1.4 and if the absolute value of the determined sine offset and the absolute value of the determined cosine offset differ by a factor of 11, the third coefficient for determining the offset error is 1.09 instead of 1.4. Generally, if the absolute value of the determined sine offset and the absolute value of the determined cosine offset are comparable the factor is 1.4 (exactly $\sqrt{2}$) and as the difference increases the factor goes to 1.0.

Figures 3A, 3B:
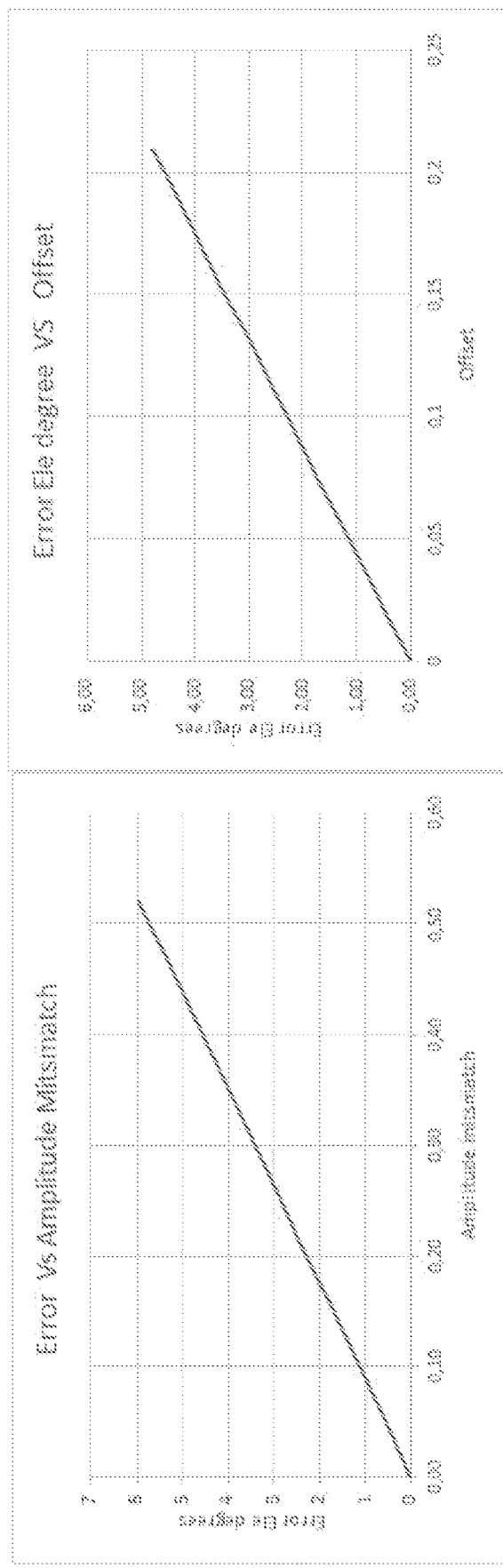
FIG. 3A a diagram showing the error electrical degree versus the Offset applied only in one channel (Sine or Cosine).
FIG. 3B a diagram showing the error electrical degree versus the amplitude mismatch applied.

FIG. 3A shows a diagram showing the error electrical degree versus the offset applied only in one channel (Sine or Cosine) and FIG. 3B shows a diagram showing the error electrical degree versus the amplitude mismatch applied. The error caused by offset and amplitude mismatch separately, is linear. It was demonstrated by applying offset or mismatch to sine or cosine signals and the error was proportional to the effect applied, as shown in FIGS. 3A and 3B. Since the behaviour is proportional, the equation of a line has been used with the following slopes:

$$m\_offset = \frac{4,8}{0,209},$$

For amplitude of 2.5 V;

$$m\_amp = \frac{5,95}{0,52};$$

for an amplitude of 2.5 V.

These slopes are calculated using ideal input signals in Simulink. The same slopes are also used with real measurement data. The denominator number 0.209 respectively 0.52 are calculated for the amplitude values of 2.5 V. This has to be re-calculated in case there is a variation of the amplitude voltage as follows:

$$\text{new denominator offset} = \text{new amplitude} * \frac{0,209}{2,5}$$

$$\text{new denominator mismatch} = \text{new amplitude} * \frac{0,52}{2,5}$$

This results generally in a first coefficient of 57,416 multiplied by the current amplitude:

$$\text{first coefficient (m\_offset)} = \frac{4,8 * 2,5}{0,209} * \text{current amplitude}.$$

The second coefficient generally is 28,605 multiplied by the current amplitude:

$$\text{first coefficient (m\_amp)} = \frac{5,95 * 2,5}{0,52} * \text{current amplitude}.$$

What is claimed is:

1. A method for error detection of a position sensor, wherein the position sensor detects the movement of a target relative to a sine receiver coil and a cosine receiver coil on a printed circuit board (PCB), the method comprising the steps of:
    obtaining, by one or more processors on the PCB continuously during operation of the position sensor, first voltage picked up by the sine receiver coil and second voltage picked up by the cosine receiver coil;
    converting, by the one or more processors, the first voltage into a sine signal that is a digital signal representing the first voltage picked up by the sine receiver coil;
    converting, by the one or more processors, the second voltage into a cosine signal that is a digital signal representing the second voltage picked up by the cosine receiver coil;
    determining, by the one or more processors, an average of the sine signal to generate a sine offset;
    determining, by the one or more processors, an average of the cosine signal to generate a cosine offset;
    determining, by the one or more processors, an amplitude of the sine signal by subtracting the minimum value of the sine signal from the maximum value of the sine signal;
    determining, by the one or more processors, an amplitude of the cosine signal by subtracting the minimum value of the cosine signal from the maximum value of the cosine signal;
    determining, by the one or more processors, an amplitude mismatch by subtracting the amplitude of the sine signal from the amplitude of the cosine signal and dividing the result by 2 or by subtracting the amplitude of the cosine signal from the amplitude of the sine signal and dividing the result by 2;
    determining, by the one or more processors, an offset error factor by dividing a first coefficient by the determined amplitude of the sine signal or the determined amplitude of the cosine signal or an average of the determined amplitude of sine signal and the cosine signal;
    determining, by the one or more processors, an amplitude error factor by dividing a second coefficient by the determined amplitude of the sine signal or the determined amplitude of the cosine signal or an average of the determined amplitude of sine signal and the cosine signal;
    determining, by the one or more processors, an offset error of the position sensor by adding the absolute value of the determined sine offset and the absolute value of the determined cosine offset and multiplying the sum with the determined offset error factor and dividing the result by a third coefficient;
    determining, by the one or more processors, an amplitude error of the position sensor by multiplying the absolute value of the determined amplitude mismatch by the determined amplitude error factor;
    determining, by the one or more processors, an overall error of the position sensor by adding the determined offset error and the determined amplitude error; and
    based on the determination of the overall error, providing, by the one or more processors, a determination of whether safety integrity levels are fulfilled.

2. The method according to claim 1, wherein the first coefficient is decided based on a slope of an error electrical degree versus the offset.

3. The method according to claim 1, wherein the first coefficient is 57.416.

4. The method according to claim 1, wherein the second coefficient is decided based on a slope of an error electrical degree versus the amplitude mismatch.

5. The method according to claim 1, wherein the second coefficient is 28.605.

6. The method according to claim 1, comprising the further step of checking if the determined overall error of the position sensor is below a predefined threshold.

7. The method according to claim 1, comprising the step of issuing an alarm or indication if the determined overall error exceeds the predefined threshold.

8. The method according to claim 7, wherein the predefined threshold is three electrical degree, six electrical degree or nine electrical degree.

9. The method according to claim 1, wherein the third coefficient for determining the offset error is 1.4 if the absolute value of the determined sine offset and the absolute value of the determined cosine offset are comparable to each other.

10. The method according to claim 1, wherein the third coefficient for determining the offset error is 1.265 if the absolute value of the determined sine offset and the absolute value of the determined cosine offset differ by a factor of 3.

11. The method according to claim 1, wherein the coefficient for determining the offset error is 1.18 if the absolute value of the determined sine offset and the absolute value of the determined cosine offset differ by a factor of 5.

12. The method according to claim 1, wherein the coefficient for determining the offset error is 1.09 if the absolute value of the determined sine offset and the absolute value of the determined cosine offset differ by a factor of 11.

13. The method according to claim 1, wherein the position sensor is an inductive position sensor.

14. The method according to claim 1, wherein the position sensor is a rotational position sensor.

15. A position sensor comprising a sine receiver coil and a cosine receiver coil, generating a corresponding sine signal and a corresponding cosine signal depending on the movement of a target relative to the sine receiver coil and the cosine receiver coil, wherein the position sensor implements the method according to claim 1.

* * * * *